Figure 1:
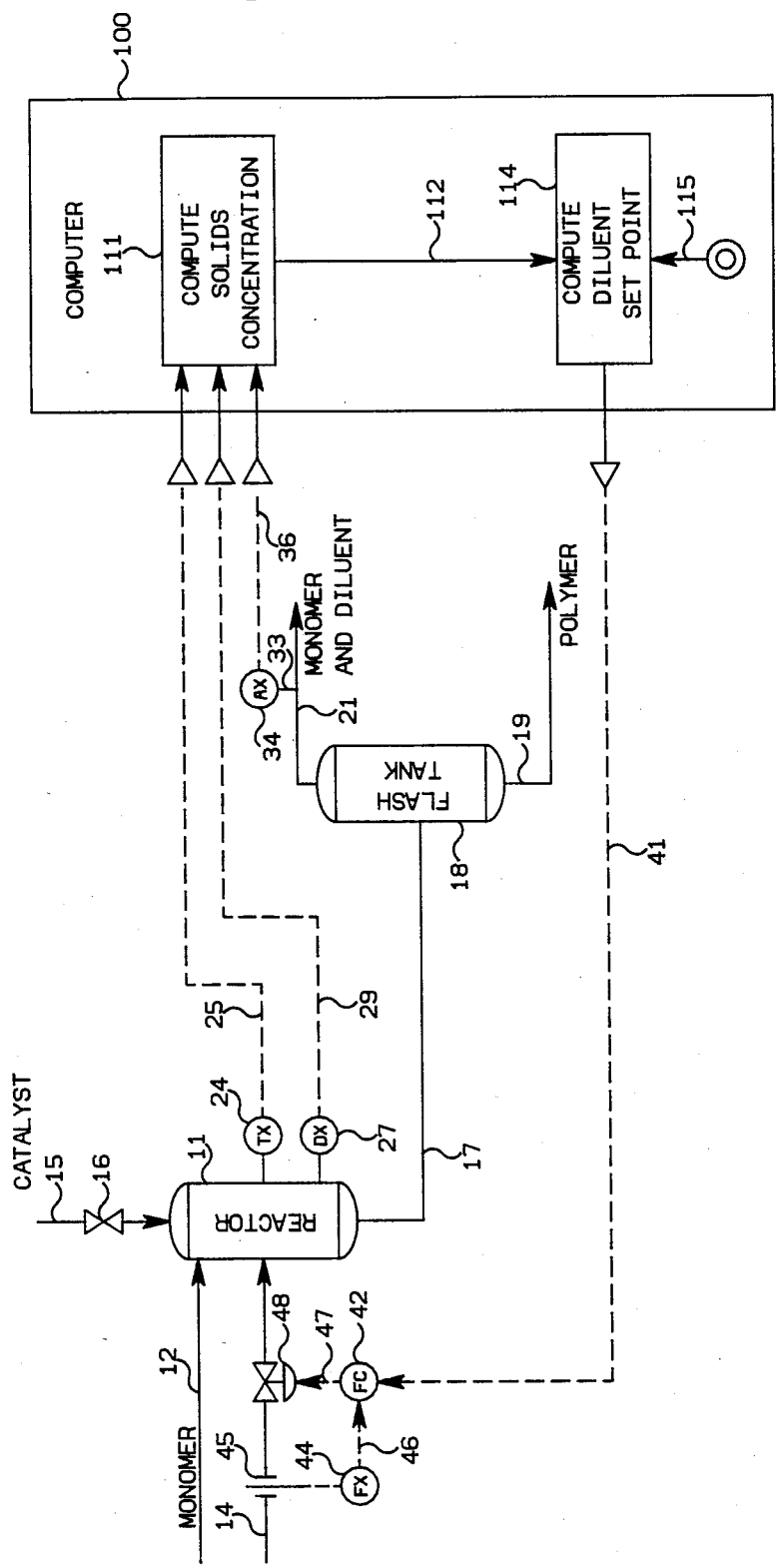

United States Patent [19]

Smith et al.

[11] Patent Number: 4,543,637
[45] Date of Patent: Sep. 24, 1985

[54] GENERATION OF A SET POINT FOR PROCESS CONTROL

[75] Inventors: Dexter E. Smith; William S. Steward; Gary L. Funk, all of Bartlesville, Okla.

[73] Assignee: Phillips Petroleum Company, Bartlesville, Okla.

[21] Appl. No.: 399,109

[22] Filed: Jul. 16, 1982

[51] Int. Cl.⁴ .............................................. G06G 7/58
[52] U.S. Cl. .................................... 364/500; 422/62; 422/111; 436/55
[58] Field of Search ............... 364/161, 162, 163, 500, 364/502; 422/62, 111; 436/55

[56] References Cited

U.S. PATENT DOCUMENTS

| Re. 30,564 | 3/1981 | Brown et al. | 318/561 |
| 3,591,783 | 7/1971 | Zumwalt | 208/164 X |
| 3,621,357 | 11/1971 | Kubo et al. | 318/600 |
| 3,636,326 | 1/1972 | Smith et al. | 318/610 X |
| 3,800,288 | 3/1974 | Russell et al. | 364/200 |
| 3,878,379 | 4/1975 | Moody, Jr. et al. | 364/500 |
| 3,925,640 | 12/1975 | Duggan | 318/585 X |
| 4,197,577 | 4/1980 | Johnson et al. | 364/163 X |
| 4,250,543 | 2/1981 | Smith et al. | 364/105 |
| 4,346,433 | 8/1982 | Rutledge | 364/162 |

Primary Examiner—Errol A. Krass
Assistant Examiner—Edward R. Cosimano
Attorney, Agent, or Firm—French and Doescher

[57] ABSTRACT

In a process in which a first process variable is manipulated so as to maintain a second process variable substantially equal to a desired value for the second process variable, a set point for the first process variable is generated based on the difference between the actual value of the second process variable and the set point for the second process variable. The magnitude of the set point is determined by the probability that the second process variable may reach an undesirable value and thus control using the set point takes into the consideration the fact that large control actions may be required under some circumstances and minimal control actions may be required under other circumstances in a process.

8 Claims, 3 Drawing Figures

GENERATION OF A SET POINT FOR PROCESS CONTROL

This invention relates to process control. In one aspect this invention relates to method and apparatus for generating a set point for a first process variable based on the difference, if any, between the actual value of a second process variable and the set point for the second process variable.

In many processes a first process variable, such as the flow rate of a fluid being provided to or withdrawn from the process or the rate at which heat is provided to or withdrawn from the process, is manipulated so as to maintain a second process variable, such as a product composition, a process temperature or a process pressure, substantially equal to a desired value (set point) for the second process variable. Typically, this is accomplished by determining the magnitude of the difference (also referred to as error), if any, which exist between the actual value of the second process variable and the desired value for the second process variable and manipulating the first process variable based on this error. Generally, the actual value and desired value are compared in a controller which may utilize various modes of control such as proportional, proportional-integral, proportional-derivative or proportional-integral-derivative. The controller accepts the actual value and desired value and produces a scaled input signal which is representative of a comparison of the actual value and desired value. The scaling of the output signal is determined by the type of process variable which is to be controlled, i.e., if a flow is to be controlled the output signal may have units of pounds per hour.

A process control engineer is faced with competing considerations when attempting to maintain the actual value of a second process variable substantially equal to a desired value by manipulating a first process variable. A first consideration is a need to avoid oscillations of the actual value of the second process variable about the set point for the second process variable. This can typically be accomplished by avoiding large changes in the first process variable over a short period of time even though it may take longer to force the actual value of the second process variable to return to the set point value. The second consideration is that in many processes it is critical that close control of a particular process variable be maintained because of the often disastrous consequences of any significant departure of the actual value of the process variable from the set point value. In these situations, it is desirable to apply a large control action if the error for the second process variable begins to become significant to prevent the adverse consequences from occuring even though this may cause oscillation of the actual value of the second process variable around the set point because of the magnitude of the control action taken.

In many processes where close control of a process variable is required, it is more dangerous for the process variable to go above or below the set point than to be in the opposite condition. Also, the danger increases as the magnitude of the error grows since the likelihood that the process variable might exceed a process limit with resulting adverse consequences is enhanced. Under this situation, the competing considerations discussed in the foregoing paragraph may be blended to some extent by varying the control action based on the sign of the error and the magnitude of the error. In this manner, a control system can be provided in which the magnitude of the control action taken is determined by the probability that an undesirable condition will occur. Thus, the probability that the undesired condition will occur is decreased while holding oscillations about the set point to a minimum.

It is thus an object of this invention to provide method and apparatus for generating a set point for a first process variable based on the error between the actual value of a second process variable and the set point for the second process variable, wherein the rate at which the set point for the first process variable is changed is dependent upon the sign of the error and the magnitude of the error.

In accordance with the present invention, method and apparatus is provided whereby a set point for a first process variable is generated based on the error between the actual value of a second process variable and the set point for the second process variable. The equation for the set point for the first process variable contains a term which is proportional to the error, a term which is proportional to the integral of the error and a term which is proportional to the error raised to some power where the magnitude of the power to which the error is raised is determined by the sign of the error. The equation for the set point for the first process variable may also contain a term which is proportional to the derivative of the error where the magnitude of such term is determined by the magnitude of the error and not simply the magnitude of the derivative of the error. In this manner, a set point is generated which can take into consideration the fact that large control action may be required under some circumstances and that minimal control action may be required under other circumstances in a process.

Figure 2A:
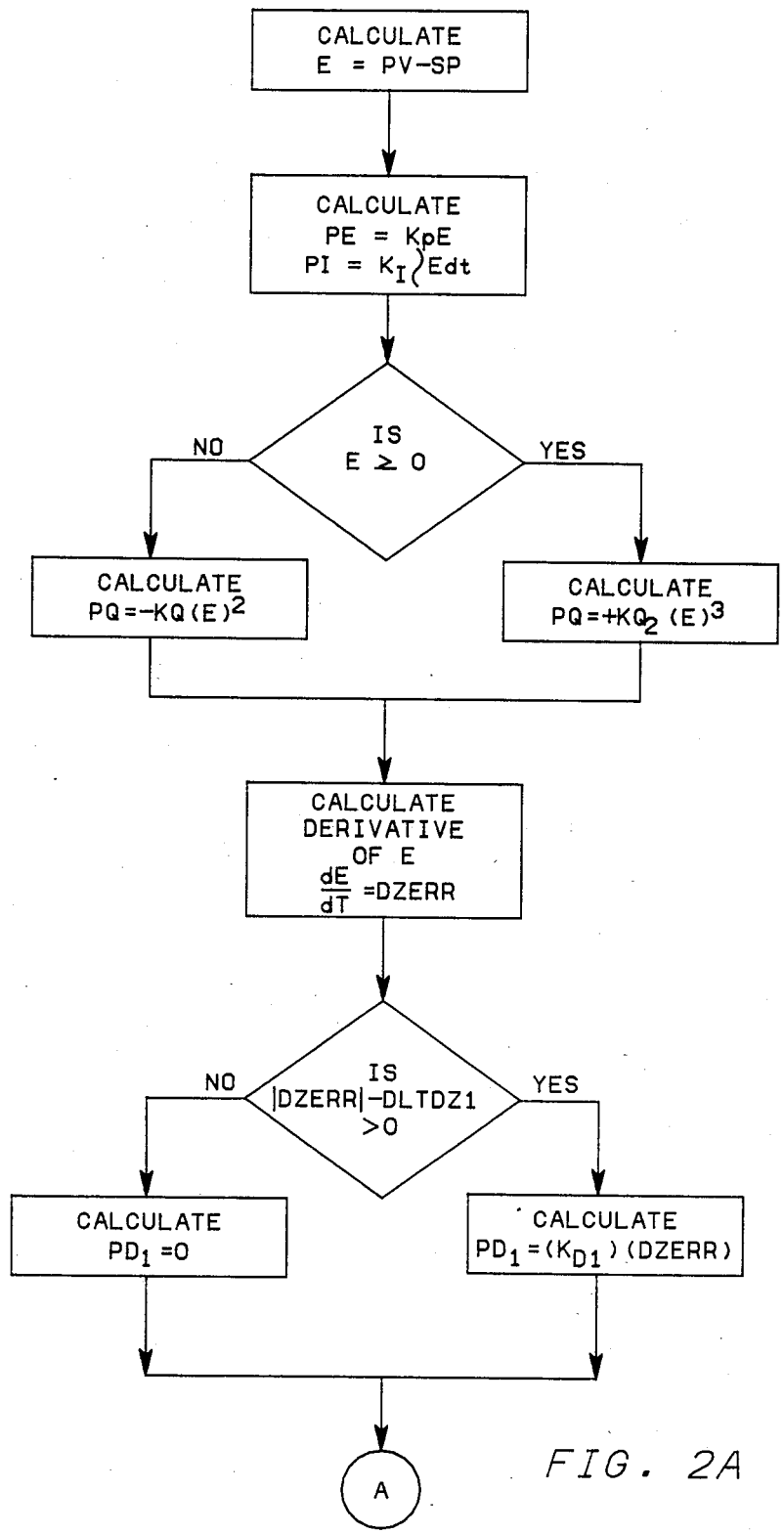
Figure 2B:
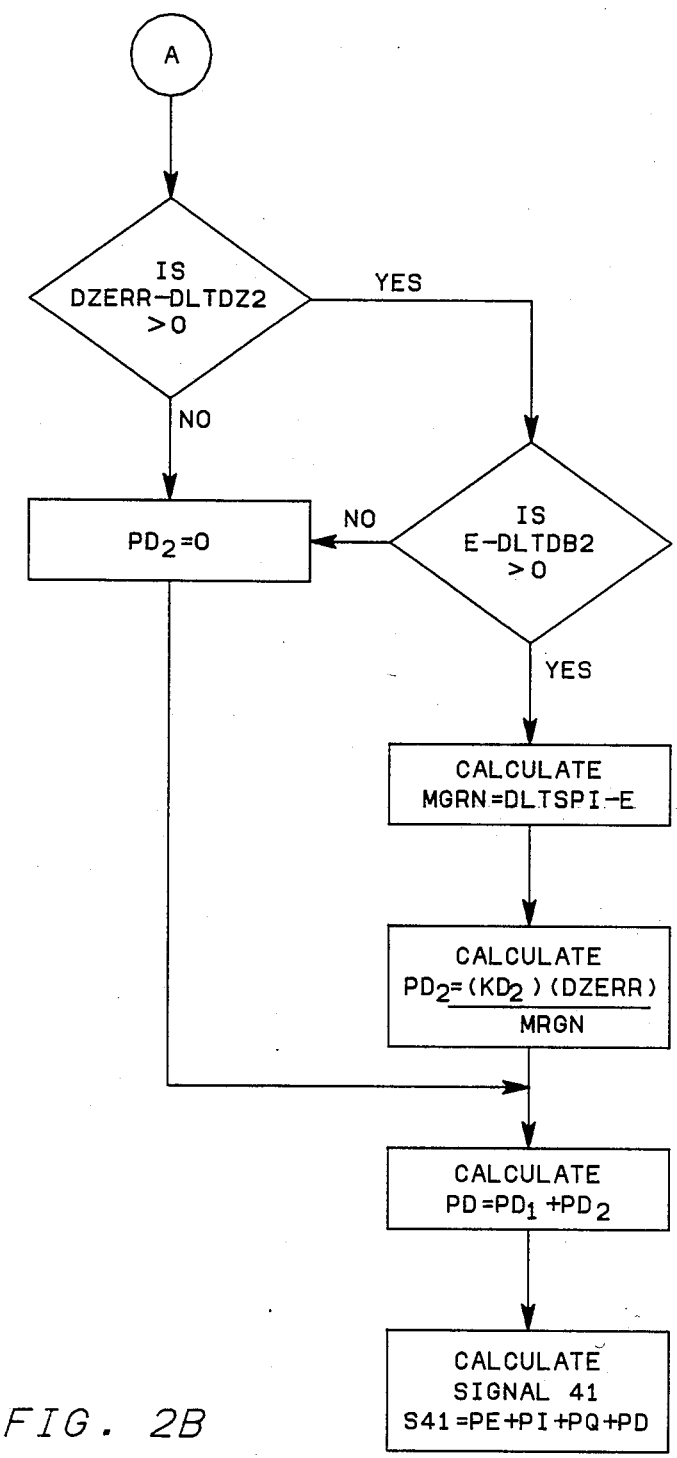

Other objects and advantages of the invention will be apparent from the foregoing brief description of the invention and from the drawings which are briefly described as follows:

FIG. 1 is a diagramatic illustration of a polymerization reaction system and an associated control system which utilizes the set point generation of the present invention; and FIGS. 2(*a* and *b*) are a logic flow diagram of the logic utilized to generate the set point in accordance with the present invention based on the error between the actual value of a process variable and a set point for the process variable.

The invention is described in terms of the polymerization or ethylene. However, the invention is applicable to any process where it is desired to manipulate a first process variable so as to maintain the actual value of a second process variable substantially equal to the desired value for a second process variable. However, it is noted that the invention is particularly applicable to the control of solids concentration in a polymerization reactor since this control is critical and it is more undesirable for the actual solids concentration to be above the set point than below the set point.

A specific control system configuration is set forth is FIG. 1 for the sake of illustration. However, the specific control configuration is not a critical feature of the present invention and the invention is applicable to a large variety of control configurations which are utilized to manipulate a first process variable so as to maintain the actual value of a second process variable substantially equal to the desired value for the second process variable.

Lines designated as signal lines in the drawings are electrical or pneumatic in this preferred embodiment. Generally, the signals provided from any transducer are electrical in form. However, the signals provided from flow sensors will generally be pneumatic in form. Transducing of these signals is not illustrated for the sake of simplicity because it is well known in the art that if a flow is measured in pneumatic form it must be transduced to electrical form if it is to be transmitted in electrical form by a flow transducer. Also, transducing of the signals from analog to digital form or from digital form to analog form is not illustrated because such transducing is also well known in the art.

The invention is also applicable to mechanical, hydraulic or other signal means for transmitting information. In almost all control systems some combination of electrical, pneumatic, mechanical or hydraulic signals will be used. However, use of any other type of signal transmission, compatible with the process and equipment in use, is within the scope of the invention.

A digital computer is used in the preferred embodiment of this invention to calculate the required control signal based on measured process parameters as well as set points supplied to the computer. The digital computer is preferably an OPTROL 7000 Process Computer System from Applied Automation, Inc., Bartlesville, Oklahoma.

Signal lines are also utilized to represent the results of calculations carried out in a digital computer and the term "signal" is utilized to refer to such results. Thus, the term signal is used not only to refer to electrical currents or pneumatic pressures but is also used to refer to binary representations of a calculated or measured value.

The various transducing means used to measure parameters which characterize the process and the various signals generated thereby may take a variety of forms or formats. For example, the control elements of the system can be implemented using electrical analog, digital electronic, pneumatic, hydraulic, mechanical or other similar types of equipment or combinations of one or more such equipment types. While the presently preferred embodiment of the invention preferably utilizes a combination of pneumatic final control elements in conjunction with electrical analog signal handling and translation apparatus, the apparatus and method of the invention can be implemented using a variety of specific equipment available to and understood by those skilled in the process control art. Likewise, the format of the various signals can be modified substantially in order to accommodate signal format requirements of the particular installation, safety factors, the physical characteristics of the measuring or control instruments and other similar factors. For example, a raw flow measurement signal produced by a differential pressure orifice flow meter would ordinarily exhibit a generally proportional relationship to the square of the actual flow rate. Other measuring instruments might produce a signal which is proportional to the measured parameter, and still other transducing means may produce a signal which bears a more complicated, but known, relationship to the measured parameter. Regardless of the signal format or the exact relationship of the signal to the parameter which it represents, each signal representative of a measured process parameter or representative of a desired process value will bear a relationship to the measured parameter or desired value which permits designation of a specific measured or desired value by a specific signal value. A signal which is representative of a process measurement or desired process value is therefore one from which the information regarding the measured or desired value can be readily retrieved regardless of the exact mathematical relationship between the signal units and the measured or desired process units.

Referring now to FIG. 1, there is illustrated a polymerization reactor 11. Ethylene is provided to the polymerization reactor 11 through conduit means 12. In like manner, a diluent such as isobutane is provided to the polymerization reactor 11 through conduit means 14 and a catalyst, such as a typical chromium oxide on silica catalyst or a silica-titania catalyst, is provided to the polymerization reactor 11 through conduit means 15. The catalyst flowing through conduit means 15 will be introduced periodically into the reactor 11. This is accomplished by use of the catalyst feeder valve 16 which is operably located in conduit means 15.

The reaction effluent is removed from the reactor 11 through conduit means 17 and is provided to the flash tank 18. The reaction effluent will be made up of polyethylene, unreacted ethylene and isobutane. The catalyst will generally be contained in the polyethylene.

The polyethylene is separated from the unreacted ethylene and the isobutane in the flash tank 18. Polyethylene is removed from the flash tank 18 through conduit means 19. Unreacted ethylene and isobutane are removed from the flash tank 18 through conduit means 21.

The diluent fed into the reactor does not react but is rather utilized to control solids concentration. The set point generation of the present invention is utilized to maintain the actual solids concentration substantially equal to the desired solids concentration by manipulating the flow rate of the diluent. For the particular polymerization process in which the set point generation of the present invention was implemented, the set point for solids in the reactor was 30%. If the solids concentration exceeded 33%, the liquid in the reactor could go solid resulting in a completely plugged reactor which is very difficult to clean. If the solids concentration went below 25%, ethylene could go to gas and rupture the sealing disc in the reactor. Since the margin between the set point and the point at which the liquid in the reactor would go solid is smaller than the margin between the set point and the point at which ethylene could go to gas, it is more critical that the solids concentration not go above the set point as compared to going below the set point. Also, it is easier to replace sealing discs in a reactor than to clean a reactor filled with solid polymer.

Temperature transducer 24 in combination with a temperature sensing device such as a thermocouple, which is operably located in the reactor 11, provides an output signal 25 which is representative of the temperature in the reactor 11. Signal 25 is provided from the temperature transducer 24 as in input to computer 100 and is specifically provided to the compute solids concentration block 111.

The gamma density gauge 27, which may be a Radiation-density gage as described in Perry's Chemical Engineers Handbook, Fifth Edition, Section 22, McGraw-Hill, provides an output signal 29 which is representative of the density of the fluid in the reactor 11. Signal 29 is provided from the density gauge 27 as an input to the compute solids concentration block 111.

A sample of the fluid flowing through conduit means 21 is provided to the analyzer transducer 34 through conduit means 33. The analyzer transducer 34 is preferably a chromatographic analyzer such as the Optichrom 102 chromatographic analyzer from Applied Automation, Inc., Bartlesville, Oklahoma. The analyzer transducer 34 provides an output signal 36 which is representative of the concentration of ethylene in the fluid flowing through conduit means 21. Essentially, signal 36 is representative of the concentration of unreacted ethylene removed from the reactor 11. Signal 36 is provided from the analyzer transducer 34 as an input to the compute solids concentration block 111.

The actual solids concentration in the reactor is calculated based on the measured process variables by the conventional technique of using an equation such as that set forth in Proceedings of the 1973 ISA Joint Spring Conference, D. E. Smith, "Control of Polyolefin Reactors Using Calculated Values of Process Variables". It is noted that any technique could be utilized to compute the solids concentration since the technique by which the solids concentration is determined is not a critical feature of the present invention.

Signal 112, which is representative of the actual solids concentration in the reactor, is provided from the compute solids concentration block 111 as the process variable input to the compute diluent set point block 114 which is essentially a controller having the set point generation features of the present invention.

Signal 115, which is representative of the desired solids concentration (30% for the ethylene reactor to which the present invention was applied), is provided as the set point input to the compute diluent set point block 114. In response to signals 112 and 115, a set point for the flow rate of diluent through conduit means 14 is calculated in the compute diluent set point block 114 as will be more particularly described hereinafter in the description of FIG. 2. Signal 41, which is representative of the calculated set point for the flow rate of the diluent which will maintain the actual solids concentration represented by signal 112 substantially equal to the desired solids concentration represented by signal 115, is provided as a control output from computer 100 to the flow controller 42.

Flow transducer 44 in combination with the flow sensor 45, which is operably located in conduit means 14, provides an output signal 46 which is representative of the actual flow rate of the diluent through conduit means 14. Signal 46 is provided as the process variable input to the flow controller 42 which is preferably a proportional-integral-derivative controller.

In response to signals 41 and 46, the flow controller 42 provides an output signal 47 which is responsive to the difference between signals 41 and 46. Signal 47 is scaled so as to be representative of the position of the control valve 48, which is operably located in conduit means 14, required to maintain the actual flow rate of the diluent through conduit means 14 substantially equal to the desired flow rate represented by signal 41. Signal 47 is provided from the flow controller 42 as the control signal to the control valve 48 and the control valve 48 is manipulated in response thereto.

Referring now to FIG. 2, there is illustrated a logic flow diagram for the logic utilized to compute the diluent set point signal 41. The first step is to subtract PV (signal 112) from SP (signal 115) to establish the error (E) which is representative of the difference between the actual solids concentration in the reactor 11 as represented by signal 112 and the desired solids concentration as represented by signal 115. A proportional term (PE) is then calculated by multiplying the error by a proportionality constant ($K_p$) which was 250 (lb/hr)/1% change in E. An integral term (PI) is derived by multiplying the integral of E as a function of time by an integral constant ($K_i$) which was 50 (lb/hr)/1% change in E.

It is noted that the values given for the constant $K_p$ and $K_i$ were the values actually utilized in a polymerization process to which the set point generation of the present invention was applied. Also, the value of other constants and limits which will be described hereinafter were the values actually utilized. These values would generally be determined based on operating experience and would generally be different for different processes.

After calculating PE and PI, a decision block is utilized to determine whether the error is greater than or equal to zero. This decision is made because the control action will be different depending upon whether the process variable is below the set point or above the set point since the probability of adverse conditions occurring is greater when the process variable is above the set point. If the error is greater than or equal to zero, a more powerful control action is desired and thus a cube of the error is multiplied by the constant $K_{Q2}$ which is equal to 1.2 $K_p$ to derive the power term (PQ). If the error is less than the zero, the error squared multiplied by the constant $K_{Q1}$ which is equal to 0.7 $K_p$ is utilized to calculate the power term PQ.

Any desired power could be utilized to calculate the power term PQ. Considerations that are taken into account is the fact that the higher powers will have greater effects as the error goes above 1 but higher powers will also have a more destabilizing effect on the process since they may produce a very large control action in a very short time. Thus, it is desirable to use as low a power as possible while still maintaining the desired control action. For the process to which the set point generation of the present invention was applied, it was preferred to use a cube of the error when the process variable was greater than or equal to the set point and to use a square of the error when the process variable was less than the set point.

After the power term PQ is calculated, the derivative of the error as a function of time (DZERR) is calculated. The derivative of the error is obtained from an equation of differences applied to a set of five successive observations which yields a corrected or "smooth" derivative at the central point as is illustrated in Wylie, "Advanced Engineering Mathematics", second edition, section 5.6, page 185. The specific equation utilized was $$DZERR = \frac{(.8)(3600)}{(.4)(N)(SI)} \left[ Y_{-2} - Y_{+2} + \frac{(Y_{-1} - Y_{+1})}{2} \right] \quad (1)$$

where:
$Y_i$ = % solids from a running average for N calculated values;
$Y_{-2}$ = the newest Wylie point;
$Y_{+2}$ = oldest Wylie point;
N = Number of calculated values of % solids to obtain one Wylie point;
SI = Sample interval in seconds.

The derivative of the error (DZERR) provides an indication of the rate at which the solids concentration in the reactor is changing and also provides an indication of the direction of that change. Thus, if the sign of DZERR is negative, the solids concentration is decreasing while a positive sign indicates an increasing solids concentration.

After calculation of DZERR, a determination is first made as to whether the solids concentration is increasing or decreasing at a rate faster than the rate represented by DLTDZ1 which was chosen to be +0.25%/Hr. If the absolute value of the derivative of the error is not greater than +0.25%/Hr., then the first part of the derivative term ($PD_1$) is set equal to zero. If the absolute value of the derivative of the error is greater than +0.25%/Hr., then $PD_1$ is set equal to the derivative of the error multiplied by the constant $KD_1$ which was chosen to be 300 lb./1%. Thus, $PD_1$ will have a magnitude only when the absolute value of the derivative of the error is greater than a predetermined value.

After calculating $PD_1$, the derivative of the error (DZERR) is again examined to determine if the solids concentration is increasing at a rate greater than DLTDZ2 which was chosen to be +0.25%/Hr. If the answer is no, the second derivative term ($PD_2$) is set equal to zero. I the answer is yes, the solids concentration is examined to determine if it is more than 1.5% above the set point (DLTDB2 was chosen to be 1.5%). Thus, if the error is negative or is less than 1.5%, $PD_2$ will again be set equal to zero. However, if the error is greater than 1.5% above the set point, significant control action will be taken because the probability that the reactor could go solid is increased since the actual solids concentration is greater than 1.5% above the set point and is increasing.

The first step in taking this control action is to determine how close the actual solids concentration is to a hard limit on the solids concentration which in the present case was 33%. This is accomplished by subtracting the error from a hard limit on the error (DLTSP1 was 3% since set point was 30%) to determine the margin (MRGN). $PD_2$ is then calculated by multiplying the derivative of the error by the constant $K_{D2}$ (chosen to be 350 lb./1%) and dividing the result by the margin. Thus, as the error approaches the hard limit (DLTSP1), the magnitude of the term MRGN will decrease which will result in an increase in the magnitude of the term $PD_2$.

After calculating the value of $PD_2$, the derivative term PD is calculated by adding $PD_1$ and $PD_2$. The magnitude of signal 41 is then calculated by adding the terms PE, PI, PQ and PD.

In summary, the proportional and integral terms (PE and PI) are standard modes of control which are well known. The term PQ is proportional to the error raised to a power where the magnitude of the power is determined by whether the actual solids concentration is above or below the set point. Significant control action will result from the power term as the error increases about 1%.

In like manner, the magnitude of the derivative term is dependent upon the rate at which the actual solids concentration is increasing or decreasing and upon whether the actual solids concentration is above or below the set point. Essentially, the derivative term will have one value if the solids concentration is increasing but is still below set point plus 1.5% and will have a different value if the solids concentration is increasing and is above the set point plus 1.5%. In the second case, the magnitude of the derivative term increases as the actual solids concentration approaches a hard limit.

As is well known to those skilled in control art, a number of high and low limits and smoothing filters could be employed in the logic illustrated in FIG. 2. As an example, a low limit would probably be put on the term MRGN to prevent division by zero. Also, smoothing filters with time constants ranging from 30 seconds to 1 minute would typically be utilized to filter terms such as PQ, DZERR, and MRGN to insure a smooth control action. Such limits and smoothing filters have not been illustrated since they are well known to those skilled in control art and do not play any part in the description of the present invention.

It is again noted that the present invention is not limited to the specific logic illustrated in FIG. 2. For the power term, the error could be raised to any suitable power depending on the particular process and in some processes it might be desirable to set the power term equal to zero if the actual value of the process variable is above or below the set point. Also, in some processes, the power term might have a larger magnitude if the actual value of the process variable is below the set point rather than above the set point.

The manner in which the derivative term, if utilized, is calculated may also vary. The important feature of the present invention is that, if the derivative term is utilized, the magnitude of the derivative term will vary depending upon the rate of change of the error and the position of the process variable with respect to the set point.

In the particular process to which the set point calculation of the present invention was applied, the term PD rarely has the value other than zero. Thus, the use of the derivative term is not required but is preferred to insure that the actual value of the solids concentration does not exceed a high limit such that the reactor would go solid.

The invention has been described in terms of a preferred embodiment as illustrated in FIG. 1 and 2. Specific components used in the practice of the invention as illustrated in FIG. 1, which have not previously been specified, such as temperature transducer 24, control valve 48, flow controller 42, flow transducer 44 and flow sensor 45 are each well known, commercially available control components such as are described at length in Perry's Chemical Engineer's Handbook, 4th. edition, chapter 22, McGraw-Hill. The catalyst feeder valve 16 may be a Seiscore ballcheck feeder valve.

For reasons of brevity and clarity, conventional auxiliary equipment such as pumps and other process equipment have not been included in the above description as they play no part in the explanation of the invention. Also, additional measurement-control devices such as the devices which would be utilized to control the flow rate of the ethylene and the catalyst have not been illustrated since control of the flow rate of the ethylene and the catalyst do not play any part in the explanation of the invention. However, it is noted that the control concept could be applied to different control functions in a polymerization process as well as other processes.

While the invention has been described in terms of the presently preferred embodiment, reasonable variations and modifications are possible by those skilled in the art and such variations are within the scope of the described invention and the appended claims.

That which is claimed is:

1. Apparatus comprising:

means for establishing a first signal representative of the actual value of a first process variable;

means for establishing a second signal representative of the desired value for said first process variable;

means for subtracting said second signal from said first signal to establish a third signal representative of the difference between said first signal and said second signal;

means for multiplying said third signal by a proportionality constant to establish a fourth signal representative of a proportional term;

means for integrating said third signal to establish the integral of said third signal as a function of time;

means for multiplying the integral of said third signal as a function of time by an integral constant to establish a fifth signal representative of an integral term;

means for determining if the magnitude of said third signal is greater than or less than zero;

means for establishing a sixth signal representative of a power term, wherein said power term has a magnitude equal to said third signal raised to a first power with the result being multiplied by first a power constant if the magnitude of said third signal is greater than zero and wherein said power term has a magnitude equal to said third signal raised to a second power with the result being multiplied by a second power constant if the magnitude of said third signal is less than zero;

means for establishing a seventh signal which is equal to at least the sum of the magnitudes of said fourth, fifth and sixth signals, wherein said seventh signal is the set point for a second process variable which will maintain the actual value of said first process variable substantially equal to the desired value represented by said second signal; and means for manipulating said second process variable in response to said seventh signal.

2. Apparatus in accordance with claim 1 additionally comprising:

means for establishing an eighth signal representative of the derivative of said third signal as a function of time;

means for establishing a ninth signal representative of a first derivative term, wherein said first derivative term has a magnitude of zero if the absolute value of the rate of change represented by said eighth signal is less than a first predetermined rate of change and wherein said first derivative term has a magnitude equal to said eighth signal multiplied by a first derivative constant is the absolute value of the rate of change represented by said eighth signal is greater than said first predetermined rate of change;

means for establishing a tenth signal representative of a second derivative term, wherein said second derivative term has a magnitude equal to said eighth signal multiplied by a second derivative constant with the result being divided by the difference between said third signal and a limit on the value of said third signal when the rate of change represented by said eighth signal is greater than a second predetermined rate of change and the magnitude of said third signal is greater than a second predetermined magnitude and wherein said second derivative term has a magnitude of zero if the rate of change represented by said eighth signal is less than said second predetermined rate of change or if the magnitude of said third signal is less than said second predetermined magnitude; and means for adding said ninth and tenth signal to said fourth, fifth and sixth signals to establish said seventh signal.

3. Apparatus comprising:

a polymerization reactor;

means for providing monomer to said polymerization reactor;

a catalyst feeder valve for periodically introducing catalyst into said polymerization reactor;

means for providing a diluent fluid to said polymerization reactor;

means for removing the reaction effluent containing polymer, diluent fluid and unreacted monomer from said polymerization reactor;

means for establishing a first signal representative of the actual solids concentration in said polymerization reactor;

means for establishing a second signal representative of the desired solids concentration in said polymerization reactor;

means for subtracting said second signal from said first signal to establish a third signal representative of the difference (E) between said first signal and said second signal;

means for multiplying said third signal by a proportionality constant ($K_p$) to establish a fourth signal representative of a proportional term (PE);

means for integrating said third signal to establish the integral of said third signal as a function of time;

means for multiplying the integral of said third signal as a function of time by an integral constant ($K_i$) to establish a fifth signal representative of an integral term (PI);

means for determining if the magnitude of said third signal is greater than or less than zero;

means for establishing a sixth signal representative of a power term (PQ) wherein said power term has a magnitude equal to said third signal raised to a first power with the result being multiplied by first a power constant ($K_{Q2}$) if the magnitude of said third signal is greater than zero and wherein said power term has a magnitude equal to said third signal raised to a second power with the result being multiplied by a second power constant ($-K_{Q1}$) if the magnitude of said third signal is not greater than zero;

means for establishing a seventh signal which is equal to at least the sum of the magnitudes of said fourth, fifth and sixth signals, wherein said seventh signal is representative of the flow rate of said diluent fluid which will maintain the actual solids concentration substantially equal to the desired value represented by said second signal; and means for manipulating the flow rate of said diluent fluid in response to said seventh signal.

4. Apparatus in accordance with claim 3 additionally comprising:

means for establishing an eighth signal representative of the derivative of said third signal as a function of time (DZERR);

means for establishing a ninth signal representative of a first derivative term ($PD_1$), wherein said first derivative term has a magnitude of zero if the absolute value of the rate of change represented by said eighth signal is less than a first predetermined rate of change (DLTDZ1) and wherein said first derivative term has a magnitude equal to said eighth signal multiplied by a first derivative constant ($K_{D1}$) if the absolute value of the rate of change represented by said eighth signal is greater than said first predetermined rate of change;

means for establishing a tenth signal representative of a second derivative term ($PD_2$), wherein said second derivative term has a magnitude equal to said eighth signal multiplied by a second derivative constant ($K_{D2}$) with the result being divided by the difference between said third signal and a limit on the value of said third signal (DLTSP1) when the rate of change represented by said eighth signal is greater than a second predetermined rate of change (DLTDZ2) and the magnitude of said third signal is greater than a second predetermined magnitude (DLTDB2) and wherein said second derivative term has a magnitude of zero if the rate of change represented by said eighth signal is not greater than said second predetermined rate of change or the magnitude of said third signal is less than said second predetermined magnitude; and means for adding said ninth and tenth signals to said fourth, fifth and sixth signals to establish said seventh signal.

5. A method for generating a set point for use in process control comprising the steps of:

establishing a first signal representative of the actual value of a first process variable;

establishing a second signal representative of the desired value for said first process variable;

subtracting said second signal from said first signal to establish a third signal representative of the difference between said first signal and said second signal;

multiplying said third signal by a proportionality constant to establish a fourth signal representative of a proportional term;

integrating said third signal to establish the integral of said third signal as a function of time;

multiplying the integral of said third signal as a function of time by an integral constant to establish a fifth signal representative of an integral term;

determining if the magnitude of said third signal is greater than or less than zero;

establishing a sixth signal representative of a power term, wherein said power term has a magnitude equal to said third signal raised to a first power with the result being multiplied by a first power constant if the magnitude of said third signal is greater than zero and wherein said power term has a magnitude equal to said third signal raised to a second power with the result being multiplied by a second power constant if the magnitude of said third signal is less than zero;

establishing a seventh signal which is equal to the sum of at least the magnitude of said fourth, fifth and sixth signals, wherein said seventh signal is the set point for a second process variable which will maintain the actual value of said first process variable substantially equal to the desired value represented by said second signal; and manipulating said second process variable in response to said seventh signal.

6. A method in accordance with claim 5 additionally comprising the steps of:

establishing an eighth signal representative of the derivative of said third signal as a function of time;

establishing a ninth signal representative of a first derivative term, wherein said first derivative term has a magnitude of zero if the absolute value of the rate of change represented by said eighth signal is less than a first predetermined rate of change and wherein said first derivative term has a magnitude equal to said eighth signal multiplied by a first derivative constant if the absolute value of the rate of change represented by said eighth signal is greater than said first predetermined rate of change;

establishing a tenth signal representative of a second derivative term wherein said second derivative term has a magnitude equal to said eighth signal multiplied by a second derivative constant with the result being divided by the difference between said third signal and a limit on the value of said third signal when the rate of change represented by said eighth signal is greater than a second predetermined rate of change and the magnitude of said third signal is greater than a second predetermined magnitude and wherein said second derivative term has a magnitude of zero if the rate of change represented by said eighth signal is less than said second predetermined rate of change or if the magnitude of said third signal is less than said second predetermined magnitude; and adding said ninth and tenth signal to said fourth, fifth and sixth signals to establish said seventh signal.

7. A method for manipulating the flow rate of diluent fluid to a polymerization process so as to maintain a desired solids concentration in the polymerization reactor, said method comprising the steps of:

establishing a first signal representative of the actual solids concentration in said polymerization reactor;

establishing a second signal representative of the desired solids concentration in said polymerization reactor;

subtracting said second signal from said first signal to establish a third signal representative of the difference (E) between said first signal and said second signal;

multiplying said third signal by a proportionality constant ($K_p$) to establish a fourth signal representative of a proportional term (PE);

integrating said third signal to establish the integral of said third signal as a function of time;

multiplying the integral of said third signal as a function of time by an integral constant ($K_i$) to establish a fifth signal representative of an integral term (PI);

determining if the magnitude of said third signal is greater than or less than zero;

establishing a sixth signal representative of a power term (PQ) wherein said power term has a magnitude equal to said third signal raised to a first power with the result being multiplied by a first power constant ($K_{Q2}$) if the magnitude of said third signal is greater than zero and wherein said power term has a magnitude equal to said third signal raised to a second power with the result being multiplied by a second power constant ($-K_{Q1}$) if the magnitude of said third signal is not greater than zero;

establishing a seventh signal which is equal to the sum of at least the magnitudes of said fourth, fifth and sixth signals, wherein said seventh signal is representative of the flow rate of said diluent fluid which will maintain the actual solids concentration substantially equal to the desired value represented by said second signal; and manipulating the flow rate of said diluent fluid in response to said seventh signal.

8. A method in accordance with claim 7 additionally comprising the steps of:

establishing an eighth signal representative of the derivative of said third signal as a function of time (DZERR);

establishing a ninth signal representative of a first derivative term ($PD_1$), wherein said first derivative term has a magnitude of zero if the absolute value of the rate of change represented by said eighth signal is less than a first predetermined rate of change (DLTDZ1) and wherein said first derivative term has a magnitude equal to said eighth signal multiplied by a first derivative constant ($K_{D1}$) if the absolute value of the rate of change represented by said eighth signal is greater than said first predetermined rate of change;

establishing a tenth signal representative of a second derivative term ($PD_2$), wherein said second derivative term has a magnitude equal to said eighth signal multiplied by a second derivative constant ($K_{D2}$) with the result being divided by the difference between said third signal and a limit on the value of said third signal (DLTSP1) when the rate of change represented by said eighth signal is greater than a second predetermined rate of change (DLTDZ2) and the magnitude of said third signal is greater than a second predetermined magnitude (DLTDB2) and wherein said second derivative term has a magnitude of zero if the rate of change represented by said eighth signal is not greater than said second predetermined rate of change or the magnitude of said third signal is less than said second predetermined magnitude; and adding said ninth and tenth signals to said fourth, fifth and sixth signals to establish said seventh signal.

* * * * *

UNITED STATES PATENT AND TRADEMARK OFFICE
CERTIFICATE OF CORRECTION

PATENT NO. : 4,543,637

DATED : September 24, 1985

INVENTOR(S) : Dexter E. Smith; William S. Steward; Gary L. Funk

It is certified that error appears in the above–identified patent and that said Letters Patent are hereby corrected as shown below:

Claim 1, line 23 "first a" should be ---a first---.

Claim 2, line 51 "is" should be ---if---.

Signed and Sealed this

Eighth Day of April 1986

[SEAL]

Attest:

DONALD J. QUIGG

Attesting Officer

Commissioner of Patents and Trademarks